US012717496B2

(12) United States Patent
Gieske et al.

(10) Patent No.: US 12,717,496 B2
(45) Date of Patent: Aug. 25, 2026

(54) WRITE OR STORE DRIVEN BUFFER CACHE MEMORY FOR A RAID-PROTECTED MEMORY

(71) Applicant: Micron Technology, Inc., Boise, ID (US)

(72) Inventors: Edmund Gieske, Cedar Park, TX (US); Dhawal Bavishi, San Jose, CA (US); Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/754,908

(22) Filed: Jun. 26, 2024

(65) Prior Publication Data

US 2025/0044951 A1 Feb. 6, 2025

Related U.S. Application Data

(60) Provisional application No. 63/517,290, filed on Aug. 2, 2023.

(51) Int. Cl.
*G06F 12/00* (2006.01)
*G06F 3/06* (2006.01)

(52) U.S. Cl.
CPC .......... *G06F 3/0619* (2013.01); *G06F 3/0656* (2013.01); *G06F 3/0659* (2013.01); *G06F 3/0689* (2013.01)

(58) Field of Classification Search
None
See application file for complete search history.

(56) References Cited

U.S. PATENT DOCUMENTS 5,802,569 A * 9/1998 Genduso ................ G06F 9/383 712/E9.055
2018/0095824 A1* 4/2018 Agombar ................ G06F 3/064
2024/0419368 A1* 12/2024 Li ......................... G06F 3/0616

* cited by examiner

*Primary Examiner* — Daniel D Tsui
(74) *Attorney, Agent, or Firm* — Wood IP, LLC; Theodore A. Wood

(57) ABSTRACT

There are provided a system and a method for write or store driven buffer cache memory for a Reliable Array of Independent Disks (RAID)-protected memory. For example, there is provided a system that can include a RAID subsystem configured to maintain the integrity of a section of a memory. The system can further include a buffer memory communicatively coupled to the RAID subsystem. And the RAID subsystem may be configured to limit a frequency of RAID access memory command amplification by accessing the buffer memory the subsystem is performing an operation configured to maintain the integrity of the section of the memory.

20 Claims, 9 Drawing Sheets

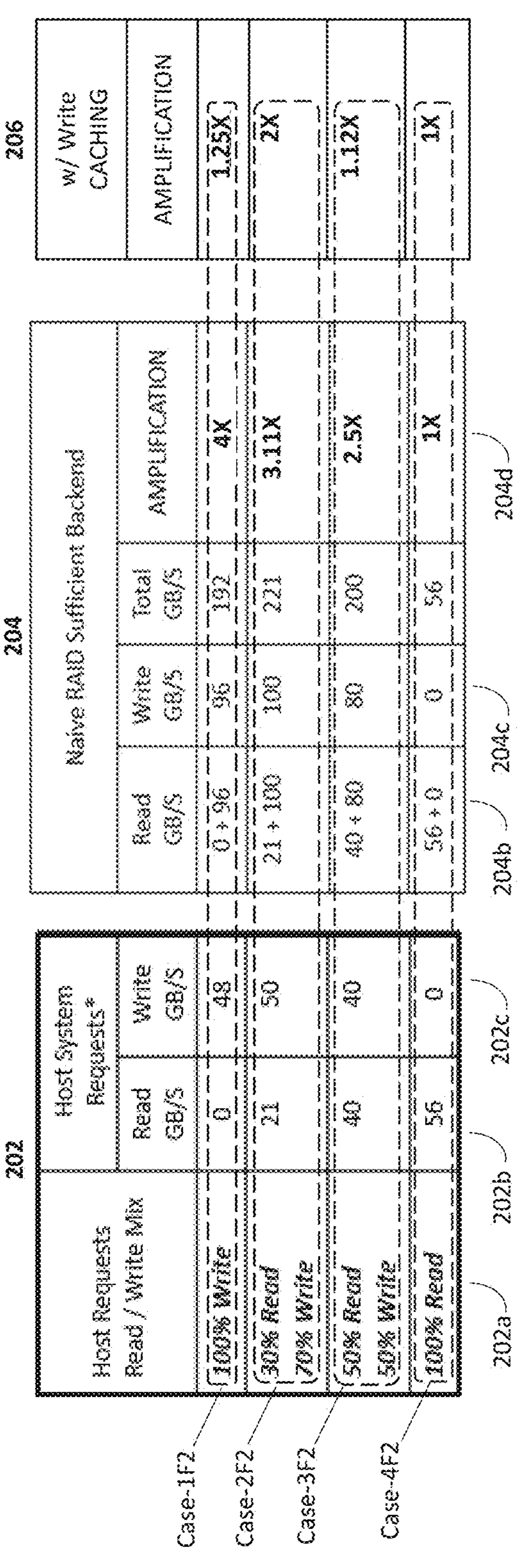

| | 202 Host Requests Read / Write Mix | 202 Host System Requests* Read GB/S | 202 Host System Requests* Write GB/S | 204 Naive RAID Sufficient Backend Read GB/S | 204 Naive RAID Sufficient Backend Write GB/S | 204 Naive RAID Sufficient Backend Total GB/S | 204 Naive RAID Sufficient Backend AMPLIFICATION | 206 w/ Write CACHING AMPLIFICATION |
|---|---|---|---|---|---|---|---|---|
| Case-1F2 | 100% Write | 0 | 48 | 0 + 96 | 96 | 192 | 4X | 1.25X |
| Case-2F2 | 30% Read 70% Write | 21 | 50 | 21 + 100 | 100 | 221 | 3.11X | 2X |
| Case-3F2 | 50% Read 50% Write | 40 | 40 | 40 + 80 | 80 | 200 | 2.5X | 1.12X |
| Case-4F2 | 100% Read | 56 | 0 | 56 + 0 | 0 | 56 | 1X | 1X |

FIG. 2

WRITE OR STORE DRIVEN BUFFER CACHE MEMORY FOR A RAID-PROTECTED MEMORY

CROSS-REFERENCE TO RELATED APPLICATION

This application claims priority to U.S. Patent Application No. 63/517,290, filed Aug. 2, 2023, which is incorporated herein by reference in its entirety.

TECHNICAL FIELD

The following relates generally to one or more systems for memory. It relates, in particular, to reliability, availability, and serviceability (RAS) features of the memory.

BACKGROUND

Memory integrity is a hallmark of modern computing. Memory systems are often equipped with hardware and/or software/firmware protocols configured to check the integrity of one or more memory sections. These protocols may also determine whether the data located therein is either accessible to higher level subsystems or whether the data is error-free.

The typical RAS infrastructure of a memory system may be configured to detect and fix errors in the system. For example, RAS features may include error-correcting systems and subsystems that execute error-correcting codes. Such protocols are hardware features that can automatically correct memory errors once they are flagged by the RAS infrastructure. These errors may be due to noise, cosmic rays, hardware transients that are due to sudden changes in power supply lines, or physical errors in the medium in which the data is stored.

Furthermore, as computer memory subsystem capacities scale, data errors become more common. Various error detection and correction approaches can be used singly or in combination to ensure that data read from a memory is identical to that previously stored or written. RAID (Reliable Array of Independent Disks) is one such error correction approach. RAID was developed for, and has been historically used in, asynchronously accessed storage devices (e.g., disks).

In contrast, computer system main memory fault protection commonly uses approaches that operate multiple memory components in lockstep. Compared to such approaches, RAID enables relatively efficient and higher performance memory read accesses and provides both memory device and more comprehensive channel fault tolerance and data protection compared to other data integrity approaches. Fast and efficient read access is desirable since reads typically pace computing systems performance and thus power consumption. Write accesses generally have less impact on system performance.

RAID data and channel protection by nature incurs significant memory access amplification when data is to be written. Typically, for every write (or store) to memory requested by a host computing system, RAID requires two separate memory read (or load) accesses followed by two write (or store) accesses. This write access memory operation or command amplification complicates the use of RAID to protect low latency, typically synchronously accessed, memories that serve mixed read and write requests.

Various types of memory devices exist, including magnetic hard disks, random access memory (RAM), read-only memory (ROM), dynamic RAM (DRAM), synchronous dynamic RAM (SDRAM), static RAM (SRAM), flash memory, and others. Memory devices may be volatile or non-volatile. Volatile memory cells (e.g., DRAM cells) may lose their programmed states over time unless they are periodically refreshed by an external power source. SRAM memory cells may maintain their programmed states for the duration of the system being powered on. Non-volatile memory cells, for example, Not-And (NAND) memory cells may maintain their programmed states for extended periods of time even in the absence of an external power source.

Many memory devices comprise multiple memory components. For example, a single read or write operation from a memory controller transfers data from or to multiple memory components in parallel. Thus, a single access may comprise data stored across multiple memory devices. Compute express link (CXL) DRAM memory devices generally require high RAS.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for the purpose of illustrating the embodiments and are not to be construed as limiting the disclosure. Given the following enabling description of the drawings, the novel aspects of the present disclosure should become evident to a person of ordinary skill in the relevant art(s).

FIG. 2 illustrates tables showing command amplification performance for several cases, according to several aspects of the present disclosure.

DETAILED DESCRIPTION

While the illustrative embodiments are described herein for particular applications, the present disclosure is not limited thereto. Those skilled in the art and with access to the teachings provided herein will recognize additional applications, modifications, and embodiments within the scope thereof and additional fields in which the present disclosure would be of significant utility.

By way of example only, and not limitation, platforms for which embodiments of the present disclosure include RAID-protected memory devices. The embodiments feature the use and/or mechanization of a buffer memory or cache memory, not to improve read performance, but rather to reduce the frequency of, and thus the negative performance and power consumption impacts of, RAID write access memory command amplification in a memory.

The embodiments provide several advantages over conventional systems. For example, write caching as provided by the embodiments, to cache either or both data read from the memory or storage backend and/or write data written by the host frontend can both reduce the number of backend reads and writes and filter the requests to the backend for accesses that are near each other in both address space and period or access series order.

Further, write caching, as provided by the embodiments, can also be combined with RAS schemes and prefetching to also reduce average read latency. For example, the following may be prefetched and cached to reduce the latency and or operations involved in completing subsequent host system request.

Figure 1:
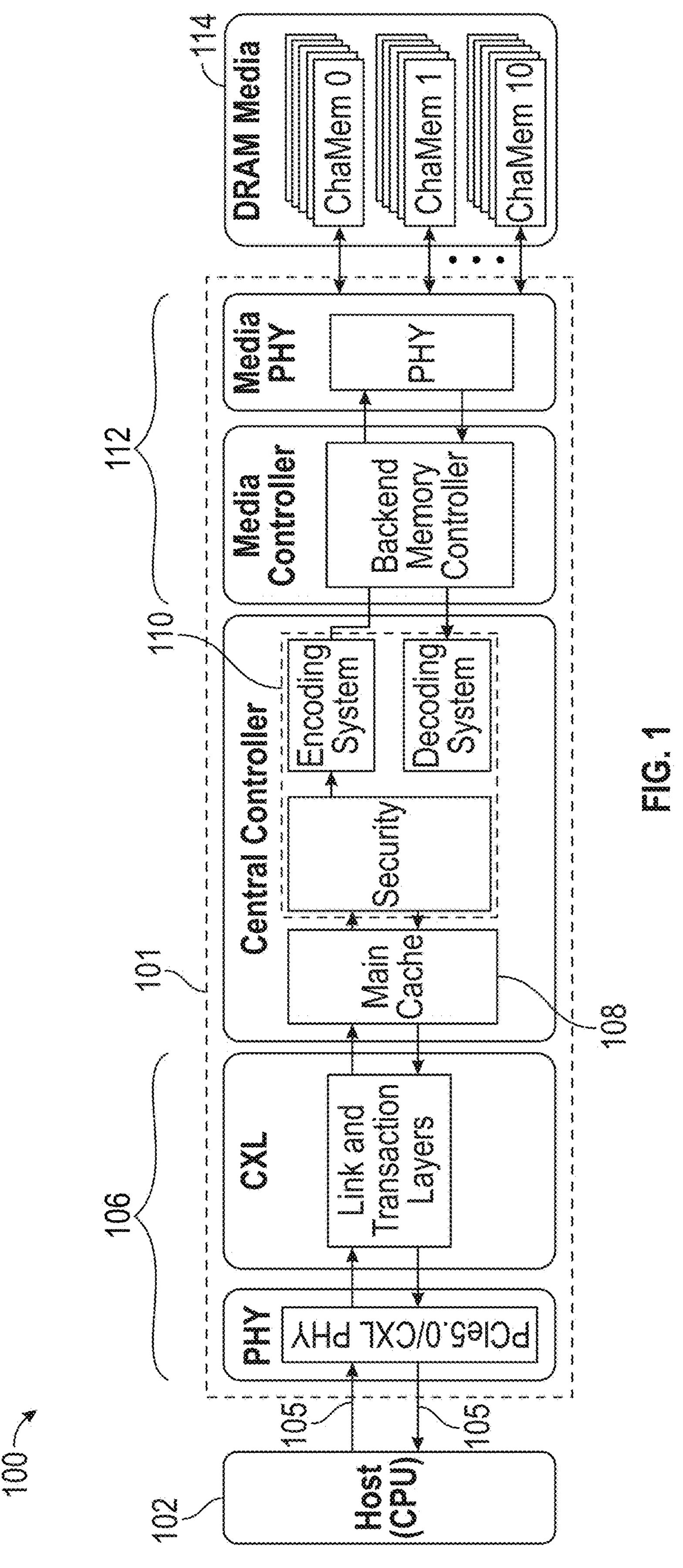
FIG. 1 illustrates a block diagram of a system including a host and a memory module, according to several aspects of the present disclosure.

FIG. 1 illustrates a functional block diagram of a system 100, according to the embodiments. The system 100 includes a host system 102 coupled to a memory module 101, via a communications link 105. The host system 102 can be a system or a subsystem configured to access the memory module 101 to write data therein or to read data therefrom. For example, and not by limitation, the host system can be a central processing unit (CPU), a graphical processing unit (GPU), or generally a computer system or subsystem equipped in hardware and software with means and protocols to perform write and read operations from the memory module 101.

Further, one of ordinary skill in the art will readily understand the arrangement of the data in the memory module 101 can be arbitrary and that the methods and systems disclosed herein are not limited to a specific data arrangement when considering the memory module 101. Furthermore, the host system 102 may be communicatively coupled to the memory module 101 via a bus, a CXL bus, or may be co-located on the same chip or on the same board.

The memory module 101 can include a front-end module 106 with circuitries for input and output functions. Such circuitries may include, for example, and without limitation, hardware for packaging commands received from the host system 102 in a predetermined format, and similarly, circuitries for packaging data obtained from the memory in a predetermined format prior to routing such data to the host system 102 upon request.

The memory module 101 can include a buffer cache (or buffer memory) 108 that is configured to cache write data in order limit the frequency of RAID access memory command amplification. This feature may be achieved by accessing the buffer cache 108 to retrieve data when performing an operation to maintain the integrity of a section of the memory components 114. Generally, the buffer cache 108 may be configured for write caching and prefetching write data stored therein.

The memory module 101 may further include a security and reliability, availability, and serviceability (SRAS) module 110, which may be configured to perform one or more tasks associated with maintaining the integrity of the data located in memory components 114. For example, and not by limitation, one such task may be a RAID protocol that is configured to ensure the integrity of the data in the memory components 114. In executing such a RAID protocol, the SRAS module 110 may be configured to cache write data in the buffer cache 108 and/or it may be configured to pre-fetch write data from the buffer cache 108 to reduce RAID access command amplification.

The memory module 101 may further include a back-end module 112 that interfaces the SRAS module 110 with the memory components 114. The back-end module 112 may generally include interface circuits that allow read/write operations to be executed on one or more sections of the memory components 114.

The memory module 101 can include the memory components 114. Without departing from the teaching of the present disclosure, the memory components 114 can include memory cells of an arbitrary architecture. For example, the memory components 114 can include DRAM arrays, SRAM arrays, etc. Generally, the memory components 114 can be any storage technology where an array of memory sections are used to store data.

FIG. 2 illustrates several performance examples 200, according to the embodiments. In FIG. 2, the host system 102 of FIG. 1 exchanges commands and/or data with the memory module 101 at bandwidths corresponding to, for example and not by limitation, an 8-lane CXL3 host interface. Thus, performance results of the embodiments are dependent upon these constraints. Without loss of generality, one of ordinary skill in the art will recognize that performance results may vary depending on bandwidth and other factors while providing the reduction of command amplifications afforded by the embodiments.

Specifically, table 202 illustrates typical read/write mix commands sent from the host system 102 to the memory module 101. These commands may occur within several non-limiting sample cases in table 202 column 202*a*. For example, sample case-1 FIG. 2 (1F2) represents 100% write commands; sample case-2F2 represents 30% read commands and 70% write commands; sample case-3F2 represents an even split: 50% read and 50% write commands; and sample case-4F2 represents 100% read commands. Read commands 202*b* and write commands 202*c* of table 202 illustrate general bandwidth consumption. Here, bandwidth consumption is a function of the architecture of the communications link 105, coupling the host system 102 and the memory module 101.

Table 204 depicts a scenario where the RAID protocol is executed naively, that is, as typically done with RAID protocols in state-of-the-art systems. In this sample approach, in the embodiments, write commands 204*c* are amplified by a factor of 2, in comparison to the right commands 202*c*. Table 204 also illustrates read command overheads 204*b*. This results in additional bandwidth usage and memory access. As can be seen in column 204*d* of Table 204, write commands are amplified by a factor of at least 2.5 (e.g., 2.5×, 3.11×, 4× etc.) when considering sample cases 1-3. The only sample case where there is no command amplification is sample case-4, where all of the requests of the host system 102 are read requests.

Table 206 illustrates the performance of an embodiment where write caching and pre-fetch commands are employed, utilizing the buffer cache 108. The command amplification is 1.25× for case-1F2 (reduced from 4× in table 204), 2× for case-2F2 (reduced from 3.11×), and 1.12× for case-3F2 (reduced from 2.5×). As demonstrated here, the system 100 can reduce memory access command amplification and save on bandwidth and power using the exemplary write caching and pre-fetch approach.

Figure 3:
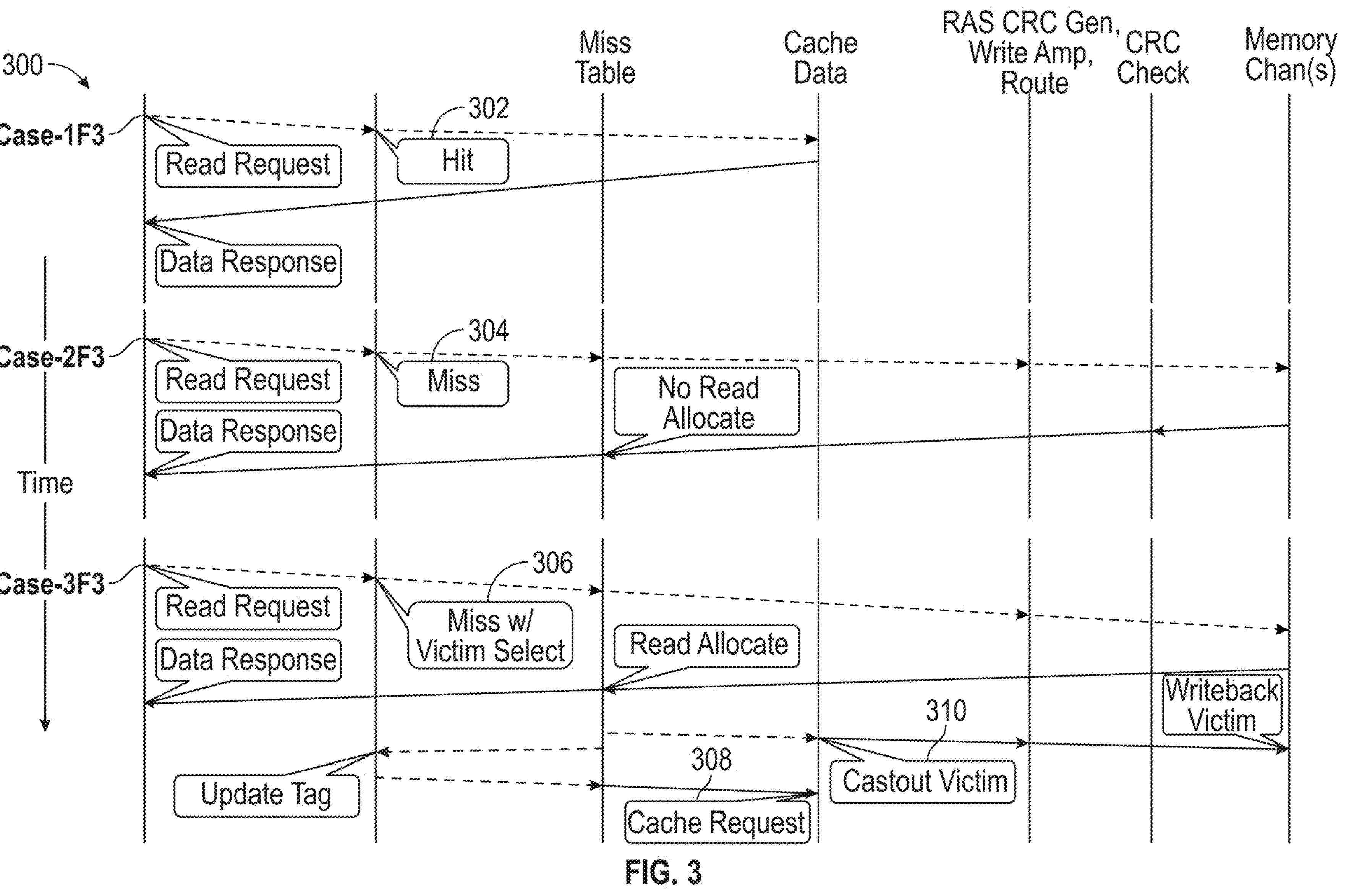
FIG. 3 illustrates a chart, according to several aspects of the present disclosure.

FIG. 3 illustrates a chart 300 of memory access patterns for the naive RAID case when read cache hit and misses occur without a RAS error. In particular, the chart 300 shows three sample cases: sample case-1FIG. 3 (1F3) when there is a cache read hit 302; sample case-2F3 when there is a cache read miss 304 without cache allocation; and sample case-3F3 when there is a cache read miss 306 with allocation. In the sample case-3F3, as time passes, cache allocation requires additional cache transactions, such as cache request 308 and castout victim 310, which require and consume additional cache bandwidth. By way of example, castout victim 310 is not required if the cache is kept clean, i.e., all writes are written through to the memory components 114.

Figure 4:
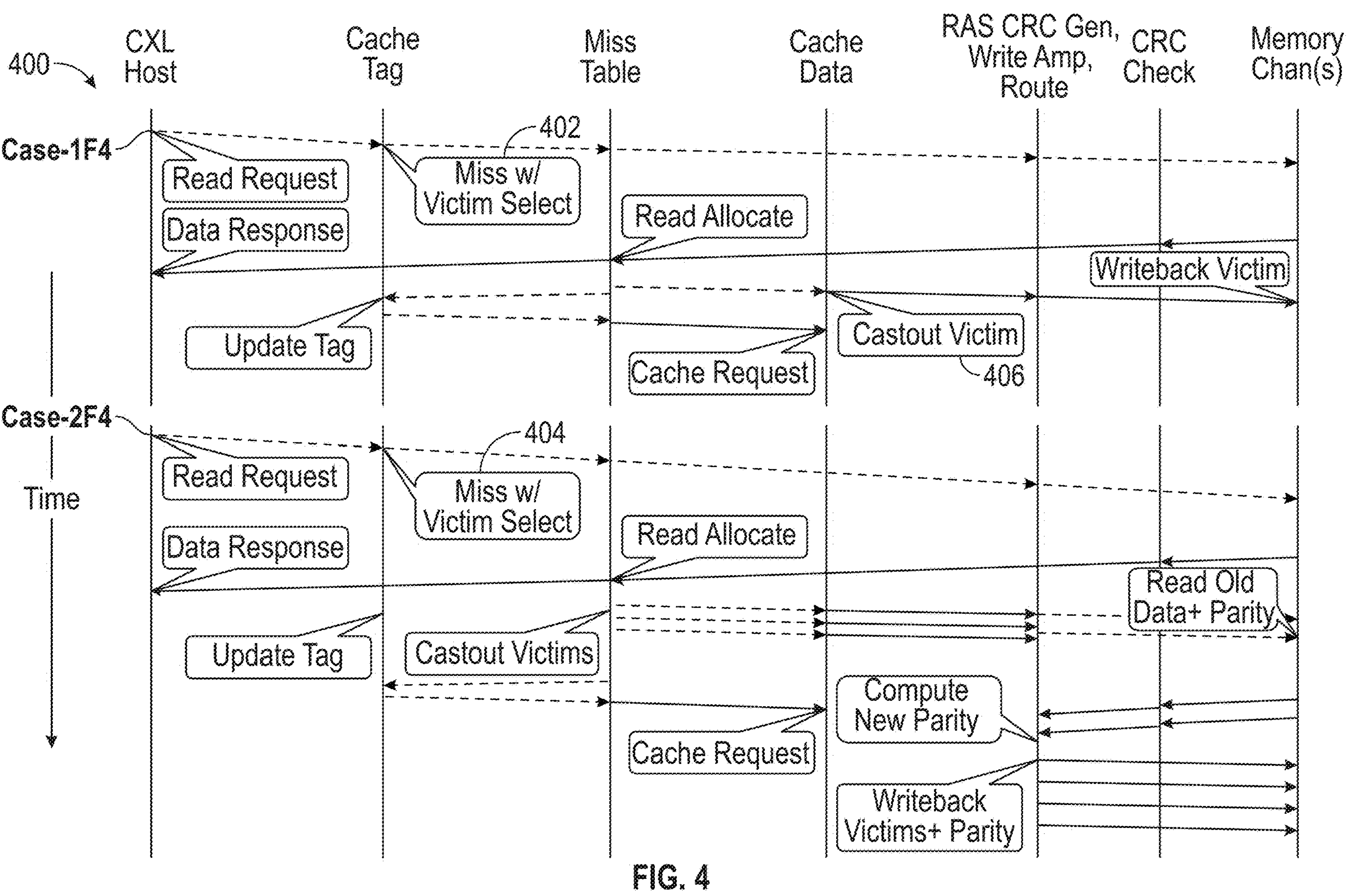
FIG. 4 illustrates a chart, according to several aspects of the present disclosure.

FIG. 4 illustrates a chart 400 of memory access patterns for sample cases, such as sample case-1 FIG. 4 (1F4) and sample case-2F4, characterized by read/write gathering cache hit and miss without a RAS error. In such cases, cache misses (e.g., 402 and 404) occur with allocation and cache misses with gathered RAS stripe castout occur prior to allocation. Cache allocation then requires additional cache transactions, increasing required cache bandwidth. Cashout of a victim section 406 is not required if cache is kept clean, i.e., all writes are written through to the memory components 114.

Figure 5:
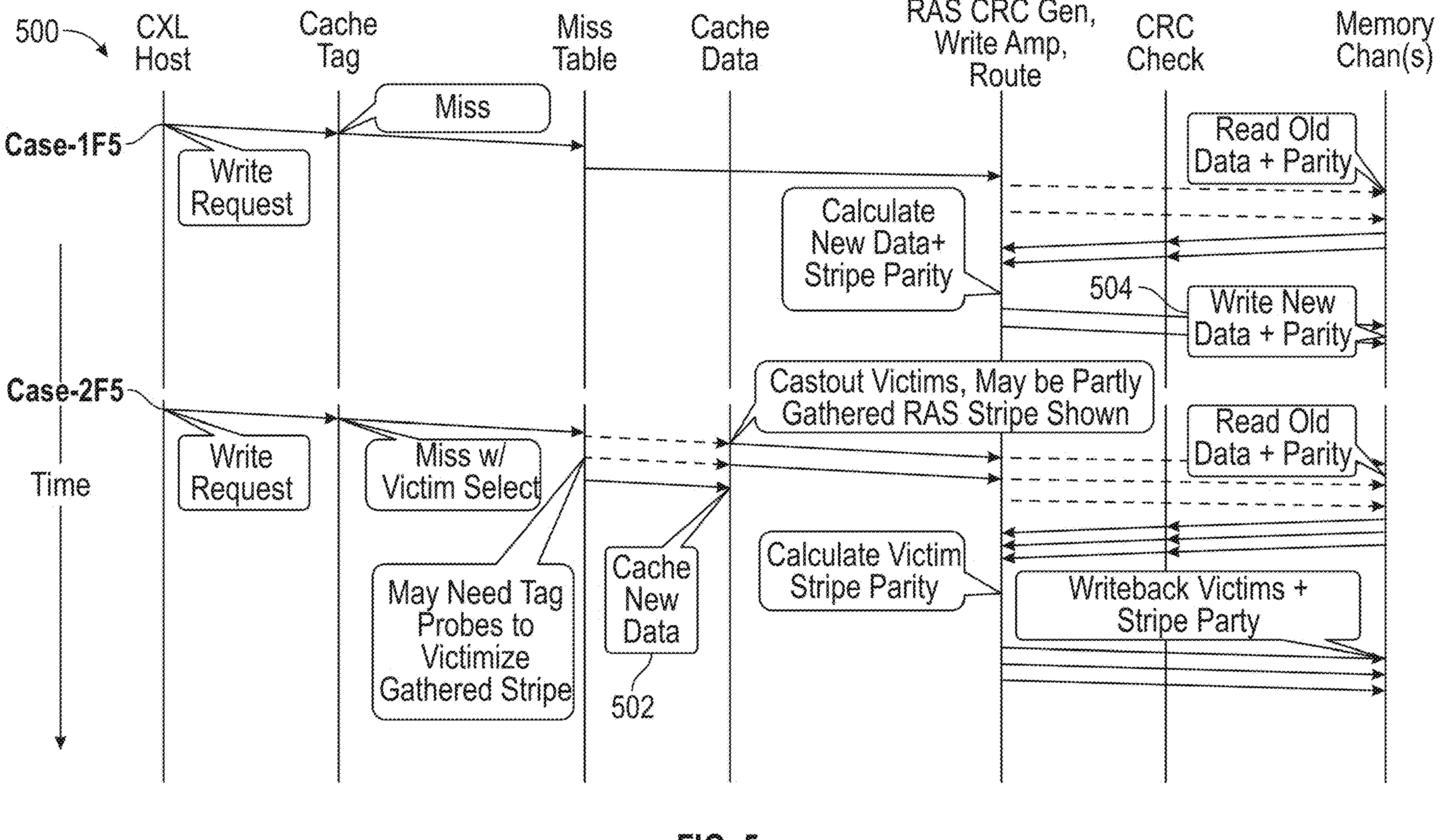
FIG. 5 illustrates a chart, according to several aspects of the present disclosure.

FIG. 5 illustrates a chart 500 of memory access patterns for cases, such as sample case-1 FIG. 5 (1F5) and sample case-2F5, characterized by a write cache hit without and with gather and cache allocation. In such cases, the parity does not allocate in the cache, and stripe parity reads are updated by a RAS manager (e.g., within SRAS module 110) in the buffer cache 108. In this embodiment, writes cache both new data 502 and parity, enabling stripe gathering. Parity is updated using updates of a miss tables array. Furthermore, write requests initiate both data and parity cache requests, and the tag must know the RAS map from the SRAS module 110.

Figure 6:
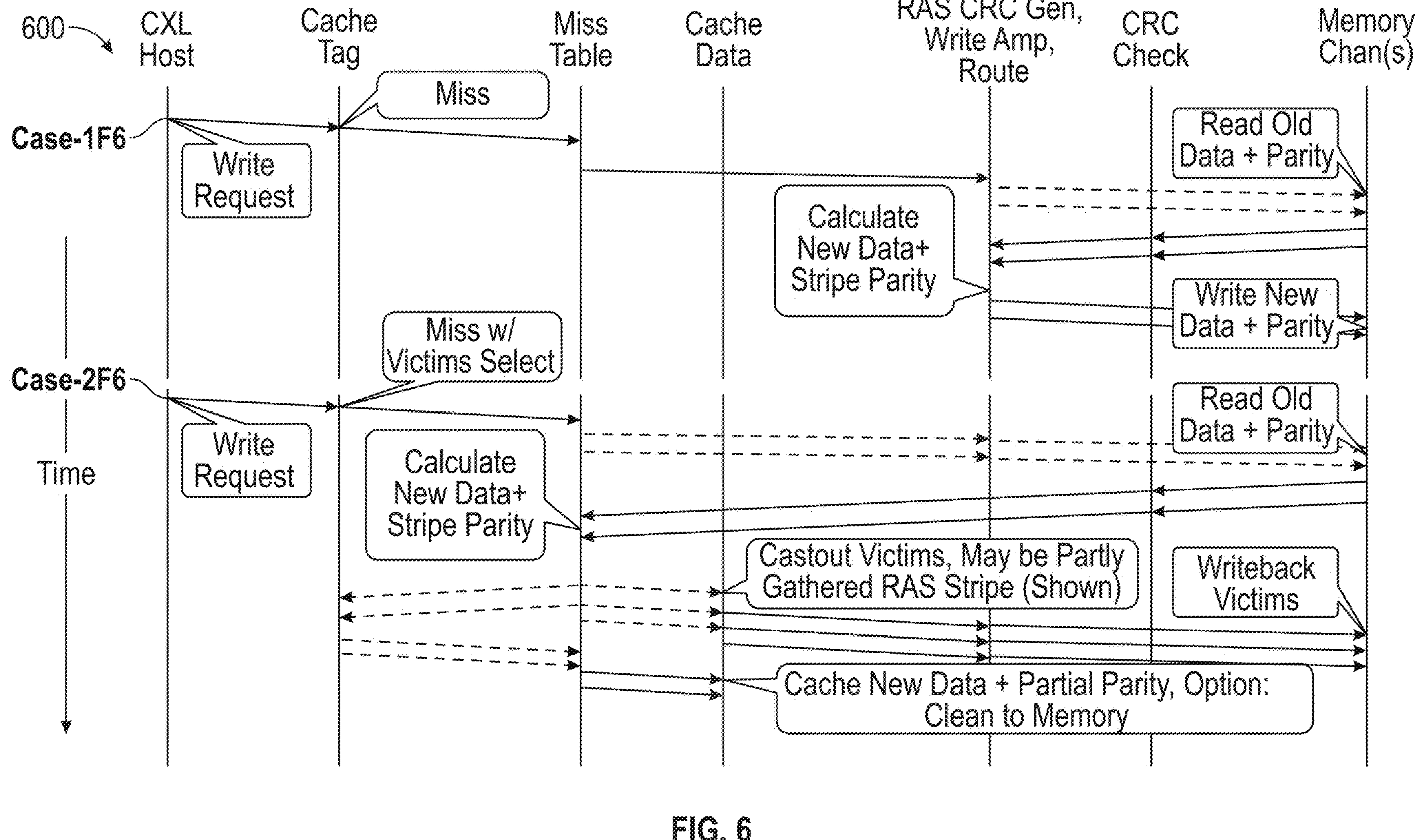
FIG. 6 illustrates a chart, according to several aspects of the present disclosure.

FIG. 6 illustrates an exemplary chart 600 of memory access patterns for cases, such as sample case-1 FIG. 6 (1F6) and sample case-2F6, characterized by write cache misses with gather and parity cache allocation. In these cases, writes do not allocate in the cache, and stripe parity reads and updates are affected by the RAS manager in the SRAS module 110. Furthermore, writes allocated in the cache are dirty (i.e., there are no write-throughs), and the victim stripe parity is updated by RAS manager of the SRAS module 110.

Figure 7:
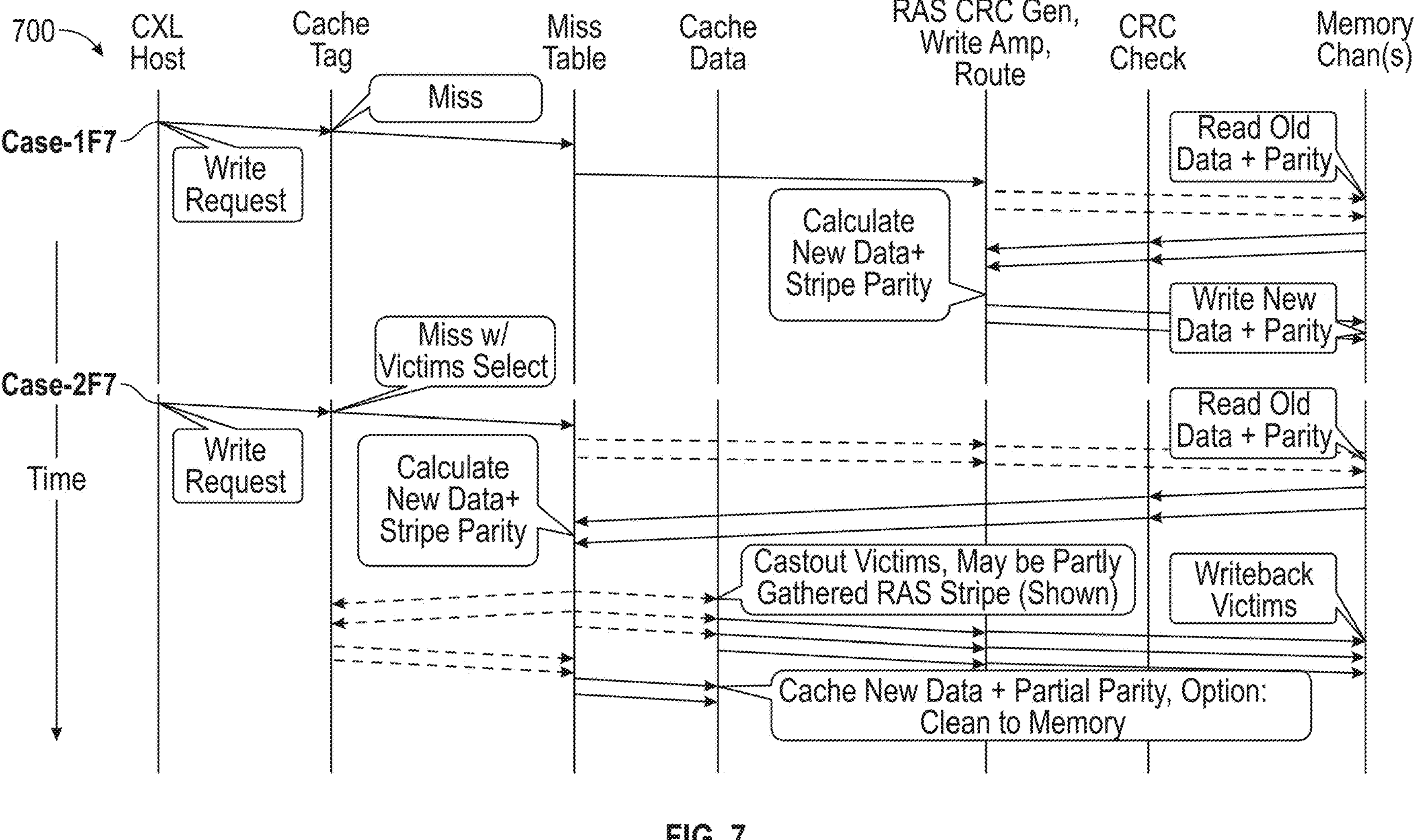
FIG. 7 illustrates a chart, according to several aspects of the present disclosure.

FIG. 7 illustrates an exemplary chart 700 of memory access patterns for cases, such as sample case-1 FIG. 7 (1F7) and sample case-2F7, characterized by write cache misses with gather and parity cache allocation. In these cases, writes do not allocate in the cache, and stripe parity reads is updated by the RAS manager of the SRAS module 110. Furthermore, writes allocate both new data and Miss Table updates parity in the cache to enable gathering.

Figure 8:
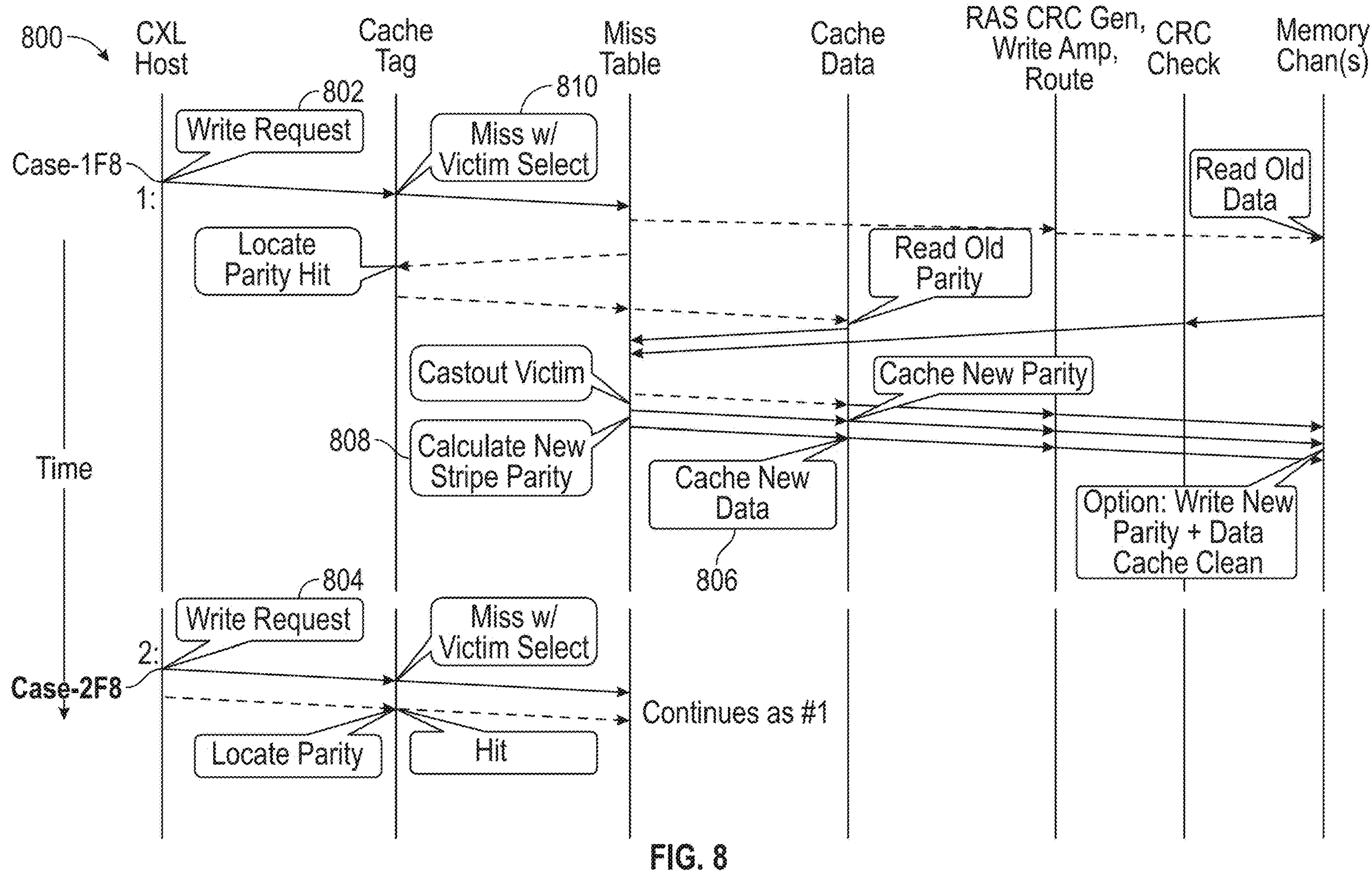
FIG. 8 illustrates a chart, according to several aspects of the present disclosure.

FIG. 8 illustrates an exemplary chart 800 of memory access patterns for cases, such as sample case-1 FIG. 8 (1F8) and sample case-2F8, characterized by write cache misses with gathering on cached RAS stripes. In the sample cases-1F8 and 2F8, write requests (e.g., 802 and 804) cache both new data 806 and stripe parity 808, which enables gathering, and a miss table 810 updates the stripe parity 808. In these cases, write data cache hits with RAS stripe parity cache misses are not possible if the parity is always the last stripe sector to be castout. If the cache is maintained as clean, then victim cache lines need not be castout and written back to memory. However, write requests initiate both data and parity cache request, and the cache tag knows the RAS map.

The write cache feature contemplated in the present disclosure may be implemented in several ways, as would one of ordinary skill in the art readily recognize. By way of example only, four non-limiting examples of write cache implementations for use in a RAID5 (4+1) subsystem to implement channel-fault-tolerance within an overall RAS scheme for a 64 B host system user data cache-line length are noted below. The write cache lines may be managed as 64 B sectors to match the host system cache line size and facilitate write cache management.

In a first implementation, a write cache memory with line or block size of 320 B (i.e., 256 B user data+64 B RAID XOR or 5×64 B sectors per write cache line sized to exactly fit the RAID stripes). In a second implementation, a write cache memory with a line or block size of more than 320 B (e.g., 512 B) in which an entire RAID stripe including both 4 user data 64 B sectors and one associated RAID stripe exclusive or (XOR) 64 B sector can be contained constituting a 320 B portion of the cache line.

In a third implementation, separate cache memories, one cache with a 256 B cache line/block size containing 4 adjacent 64 B user data sectors and a second cache with a 64 B cache line/block size for RAS XOR could be used. In a fourth implementation, a write cache memory with a line or block size of 64 B, in which each line can store either a 64 B host system user data cache line or a 64 B RAID XOR without cache indexing conflicts among all the user data cache lines and RAID stripe XOR in that RAID stripe.

Figure 9:
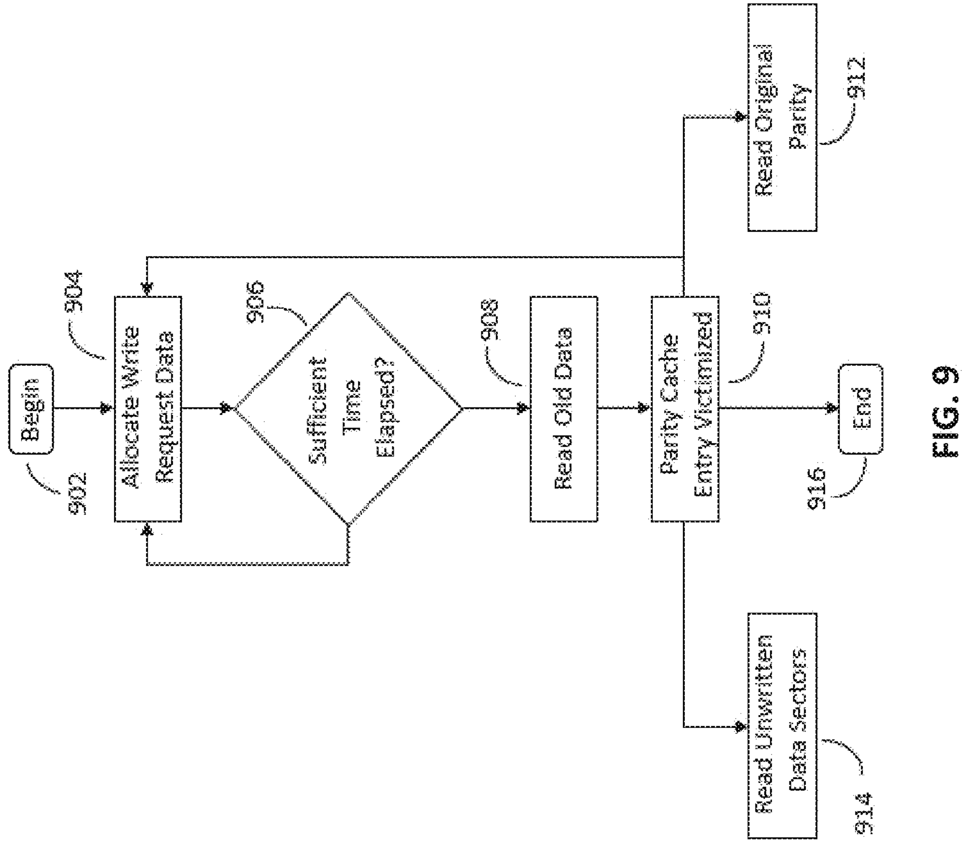
FIG. 9 illustrates a method, according to several aspects of the present disclosure.

FIG. 9 illustrates a flowchart of an exemplary method 900 a practicing an embodiment of the present invention, beginning at block 902. The method 900 includes allocating host write request data into the write buffer cache (e.g., the buffer cache 108) at block 904. At the decision block 906, the method 900 detects whether sufficient time and/or unrelated requests have elapsed or based on one or more measurements of past requests to conclude that backend memory (e.g., the memory component 114) is opportunistically available. Such requests may include, for example, a moving average request rate within a variable time window.

If the backend memory is available, the method 900 includes reading old data at block 908 and computing a partial parity for storage in the buffer cache. The method 900 further includes repeating blocks 904 to 908 for write requests to the same RAID stripe. Furthermore, at block 910, the method 900 further includes waiting until data or a parity cache entry is to be victimized or whether it includes initiating victimization if the entire RAID stripe has been written and the backend memory is available.

If case writes of the whole RAID data stripe have been cached, the method 900 includes computing the parity (i.e., abandoning the cached partial parity) and writing both the data and the computed parity to the backend.

Otherwise, the method 900 proceeds to block 912 to read the original parity from the backend memory and compute a new stripe parity. Block 912 also includes writing both the parity and new data sectors to the backend memory. Alternatively, the method 900 will proceed to block 914 to read unwritten data sectors from the backend, compute the new stripe parity, and write both the new parity and new data sectors to the backend. The exemplary method 900 ends at block 916.

Having described several specific embodiments, general embodiments consistent with the teachings of the present disclosure are now described. For example, and not by limitation, such embodiments may be a system or a method. An example system can include a RAID subsystem configured to maintain the integrity of a section of a memory. The system can further include a buffer memory communicatively coupled to the RAID subsystem. And the RAID subsystem may be configured to limit a frequency of RAID access memory command amplification by accessing the buffer memory the subsystem is performing an operation configured to maintain the integrity of the section of the memory.

Without loss of generality, the buffer memory may be a cache memory, or it may be the memory module of a computer system, or it may be the memory module of a storage device. The RAID subsystem is further configured to limit the frequency of RAID write access memory command amplification. Furthermore, the system may be configured to cache data in the buffer memory, and the cached data may be user data and/or RAID XOR parity data. In such cases, the parity need not be read more than once for any later write requests.

Furthermore, the RAID subsystem may be further configured to reduce RAID parity reads when more than one data write request is gathered into the buffer memory. And, the RAID subsystem may be further configured to perform, when two user data writes are gathered for a given RAID stripe, two or three backend reads and/or three backend writes.

An example method may be configured for reducing RAID command amplification when accessing a memory. The method may include executing certain operations by a RAID subsystem configured to maintain the integrity of a section of a memory. The operations can include caching data in a buffer memory and limiting a frequency of RAID access memory command amplification. The latter may be achieved by accessing the buffer memory to retrieve data when performing an operation to maintain the integrity of a section of the memory.

In the above-noted method, the buffer memory may be one of a cache memory. Furthermore, the memory (i.e., not the buffer memory) may be a computer system memory or a storage memory. In the above-noted method, the frequency of RAID access memory command amplification may be the frequency of a write access memory command amplification, and the data cached may include write user data and/or RAID XOR parity data. And the parity data need not be read more than once for any later write requests.

The operations may further include reducing RAID parity reads when more than one data write request is gathered into the buffer memory. And, the operations may further include performing, when two user data writes are gathered for a given RAID stripe, two or three backend reads. Furthermore, the operations may include performing three backend writes.

Generally, the embodiments confer several advantages, some of which are discussed below. For example, write caching as provided by the embodiments, to cache either or both data read from the memory or storage backend and/or write data written by the host frontend can both reduce the number of backend reads and writes and filter the requests to the backend for accesses that are near each other in both address space and period or access series order.

Further, write caching, as provided by the embodiments, can also be combined with RAS schemes and prefetching to also reduce average read latency. For example, the following may be prefetched and cached to reduce the latency and or operations involved in completing subsequent host system request: on a Read in which RAID detects a Fault, the Channel-Fault-Tolerance requires a read of all the other user data and the parity in the associated RAID stripe which could then be cached to fulfill future host read requests.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A system, comprising:

a host system communicatively coupled via a communication link to a reliable array of independent disks (RAID) subsystem configured to maintain integrity of a section of memory; and a buffer memory comprising a write buffer cache configured to cache write user data and RAID XOR parity data and to prefetch write data, the buffer memory being communicatively coupled to the RAID subsystem, wherein the RAID subsystem is configured to limit a frequency of RAID access memory command amplification by retrieving cached data from the buffer memory when performing an operation to maintain the integrity of the section of the memory and wherein the host system is configured to determine, according to a moving average of write requests within a variable time window, whether the section of memory is available for receiving the cache write user data and the RAID XOR parity data.

2. The system of claim 1, wherein the buffer memory is a cache memory.

3. The system of claim 1, wherein the memory is a computer system memory.

4. The system of claim 1, wherein the memory is a storage memory.

5. The system of claim 1, wherein the frequency of RAID access memory command amplification is the frequency of a write access memory command amplification.

6. The system of claim 1, wherein the system is configured to cache write user data and RAID XOR parity in the buffer memory.

7. The system of claim 6, wherein the parity need not be read more than once for any later write requests.

8. The system of claim 1, wherein the RAID subsystem is further configured to reduce RAID parity reads when more than one data write request is gathered into the buffer memory.

9. The system of claim 1, wherein the RAID subsystem is further configured to perform, when two user data writes are gathered for a given RAID stripe, two or three backend reads.

10. The system of claim 9, wherein the RAID subsystems is further configured to perform three backend writes.

11. A method for reducing Reliable Array of Independent Disks (RAID) command amplification when accessing a computer memory system, the method comprising:

executing, by a RAID subsystem configured to maintain the integrity of a section of a memory, operations comprising:

allocating host write request data into a write buffer cache of the memory system;

caching write user data and RAID XOR parity data in the write buffer cache;

determining, according to a moving average of write requests within a variable time window, whether the section of memory is available for receiving the cache write user data and parity information;

retrieving cached data from the write buffer cache to compute updated parity; and writing the cached data and the updated parity to backend memory when the section of memory is available to receive the cached data and the parity information.

12. The method of claim 11, wherein the buffer memory is a cache memory.

13. The method of claim 12, wherein the memory is a computer system memory.

14. The method of claim 11, wherein the memory is a storage memory.

15. The method of claim 11, wherein the frequency of RAID access memory command amplification is the frequency of a write access memory command amplification.

16. The method of claim 11, wherein retrieving cached data from the write buffer cache to compute updated parity includes, reading old data and computing a partial parity.

17. The method of claim 11, wherein parity data need not be read more than once for any later write requests.

18. The method of claim 11, wherein the operations further include reducing RAID parity reads when more than one data write request is gathered into the buffer memory.

19. The method of claim 11, wherein the operations further include performing, when two user data writes are gathered for a given RAID stripe, two or three backend reads.

20. A non-transitory computer readable medium having stored thereon computer executable instructions that, if executed by a computing device, cause the computing device to perform a method for reducing Reliable Array of Independent Disks (RAID) command amplification when accessing a computer memory system, the method comprising:

executing, by a RAID subsystem configured to maintain the integrity of a section of a memory, operations comprising:

allocating host write request data into a write buffer cache;

caching write user data and RAID XOR parity data;

retrieving cached data to compute updated parity;

determining, according to a moving average of write requests within a variable time window, whether the section of memory is available for receiving the cache write user data and the updated parity; and writing the cached data and the updated parity to backend memory when the section of memory is available to receive the cached data and the updated parity.

* * * * *